US012608030B2

(12) United States Patent
Takano

(10) Patent No.: US 12,608,030 B2
(45) Date of Patent: Apr. 21, 2026

(54) POWER SUPPLY SEMICONDUCTOR INTEGRATED CIRCUIT AND POWER SUPPLY DEVICE

(71) Applicant: Yoichi Takano, Hadano (JP)

(72) Inventor: Yoichi Takano, Hadano (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 182 days.

(21) Appl. No.: 18/596,809

(22) Filed: Mar. 6, 2024

(65) Prior Publication Data

US 2024/0302854 A1 Sep. 12, 2024

(30) Foreign Application Priority Data

Mar. 7, 2023 (JP) ................................. 2023-034443

(51) Int. Cl.
*G05F 1/573* (2006.01)
*G05F 1/46* (2006.01)

(52) U.S. Cl.
CPC .............. *G05F 1/573* (2013.01); *G05F 1/465* (2013.01)

(58) Field of Classification Search
CPC ........... G05F 1/465; G05F 1/573; H02M 1/32
See application file for complete search history.

(56) References Cited

U.S. PATENT DOCUMENTS

2010/0060244 A1* 3/2010 Kurokawa .......... H02J 7/00304 320/166
2021/0100082 A1* 4/2021 Aoki ...................... H05B 45/48
2021/0313874 A1* 10/2021 Kawakami ............ H02M 3/073
2023/0052283 A1* 2/2023 Takano .................... H03K 5/24
2025/0330095 A1* 10/2025 Mishima ................ B60L 53/22

FOREIGN PATENT DOCUMENTS

JP 2000004149 A * 1/2000
JP 2005-116642 A 4/2005
JP 2007-193458 A 8/2007
JP 2011-055634 A 3/2011
JP 2022-153839 A 10/2022

OTHER PUBLICATIONS

Journal of The Japan Institute of Electronics Packaging vol. 19 No. 5 (2016), Trend of Multi-Layer Ceramic Capacitor for Automotive (Non-patent literature).

* cited by examiner

*Primary Examiner* — Sisay G Tiku
(74) *Attorney, Agent, or Firm* — Shih IP Law Group, PLLC

(57) ABSTRACT

Disclosed is a power supply semiconductor integrated circuit including: a power supply input terminal; a power supply output terminal; a ground terminal; a first external terminal to which a second terminal of a first capacitor is connected; a second external terminal to which a second terminal of a second capacitor is connected; a first detector which detects a voltage of the first external terminal; a second detector which detects a voltage of the second external terminal; a first switch between the first external terminal and the ground terminal; and a second switch between the second external terminal and the ground terminal. The first switch disconnects the second terminal of the first capacitor from ground potential upon receiving a signal from the first detector, and the second switch disconnects the second terminal of the second capacitor from ground potential upon receiving a signal from the second detector.

7 Claims, 5 Drawing Sheets

POWER SUPPLY SEMICONDUCTOR INTEGRATED CIRCUIT AND POWER SUPPLY DEVICE

REFERENCE TO RELATED APPLICATIONS

This application is based upon and claims benefit of priority from the prior Japanese Patent Application No. 2023-034443, filed on Mar. 7, 2023, the entire contents of which are incorporated herein by reference.

TECHNICAL FIELD

The present disclosure relates to power supply semiconductor integrated circuits (power supply ICs) and power supply devices that supply DC voltage, and is effective for use in, for example, regulator ICs and high-side switch ICs and power supply devices equipped with such ICs.

DESCRIPTION OF RELATED ART

There are regulator ICs that constitute power supply devices such as series regulators that convert and output DC voltages from batteries and high-side switch ICs as elements (devices) that are provided on power supply lines supplying power supply voltages from power supplies to loads, for supplying or shutting off the power supply voltages to the loads.

Bypass capacitors are essential for power supply ICs connected to automotive batteries to reduce noise in the power supply lines, stabilize IC operations, and mitigate power supply fluctuations.

Although automotive batteries are typically 12 to 14 V, considering worst-case conditions, bypass capacitors may need to be voltage-resistant to about 50 V. In addition, surface-mount ceramic capacitors are generally used as bypass capacitors in conventional automotive power supply devices. The cost and size of these surface-mount ceramic capacitors increase for higher voltage resistance and capacitance.

SUMMARY OF THE INVENTION

To compensate for the voltage resistance of the bypass capacitor while keeping costs down, and as measures against short circuits (shorts), two ceramic capacitors may be connected in series. This is because the possibility of two capacitors being shorted at the same time is very small. In JP-A-2011-55634, a power supply device with two ceramic capacitors connected in series is disclosed in FIG. 1.

However, when capacitors are connected in series, twice the capacitance value of a single capacitor is required. In addition, in the case of a single series connection, it is not possible to deal with open faults where the capacitors are disconnected. Therefore, there considered installing two capacitors in series in parallel, as in the power supply device shown in FIG. 7 (see A in FIG. 7). However, installing two rows of capacitors in series requires a total of four capacitors, which increases the cost, number of components, and mounting area. In addition, this problem becomes larger when more bypass capacitors are connected in series to improve the reliability of the power supply device.

The invention described in JP-A-2011-55634 is disclosed to prevent overcurrent that flows when a ceramic capacitor is shorted, and it is not disclosed that a power supply device can be functioned even when a ceramic capacitor is shorted.

The present disclosure has been made in view of the above-described background, and an object thereof is to provide a power supply semiconductor integrated circuit and a power supply device that can reduce the number of ceramic capacitors such as a bypass capacitor.

Another object of the present disclosure is to provide a power supply semiconductor integrated circuit and a power supply device that the power supply device can be functioned even if any of the parallel ceramic capacitors comprising the bypass capacitor is disconnected and open, or if a short or other abnormality occurs.

A further object of the present disclosure is to provide a power supply semiconductor integrated circuit and a power supply device capable of detecting when an abnormality occurs in the bypass capacitor.

To achieve at least one of the abovementioned objects, according to an aspect of the present disclosure, there is provided a power supply semiconductor integrated circuit including: a power supply input terminal to which a power supply voltage from a DC power supply is input; a power supply output terminal for outputting an output voltage; a ground terminal to which a ground potential is applied; a first external terminal to which a second terminal of a first capacitor is connected, wherein the first capacitor is located externally and has a first terminal connected to the power supply input terminal; a second external terminal to which a second terminal of a second capacitor is connected, wherein the second capacitor is located externally and has a first terminal connected to the power supply input terminal; a first detector which detects a voltage of the first external terminal; a second detector which detects a voltage of the second external terminal; a first switch which is provided between the first external terminal and the ground terminal; and a second switch which is provided between the second external terminal and the ground terminal, wherein the first switch disconnects the second terminal of the first capacitor from a ground potential upon receiving a signal from the first detector, and the second switch disconnects the second terminal of the second capacitor from a ground potential upon receiving a signal from the second detector.

BRIEF DESCRIPTION OF DRAWINGS

The accompanying drawings are not intended as a definition of the limits of the invention but illustrate embodiments of the invention, and together with the general description given above and the detailed description of the embodiments given below, serve to explain the principles of the invention, wherein.

DETAILED DESCRIPTION

Hereinafter, one or more embodiments of the present disclosure will be described with reference to the drawings. However, the scope of the present invention is not limited to the disclosed embodiments.

The following is a description of a suitable embodiment of the present disclosure based on the drawings.

Figure 1:
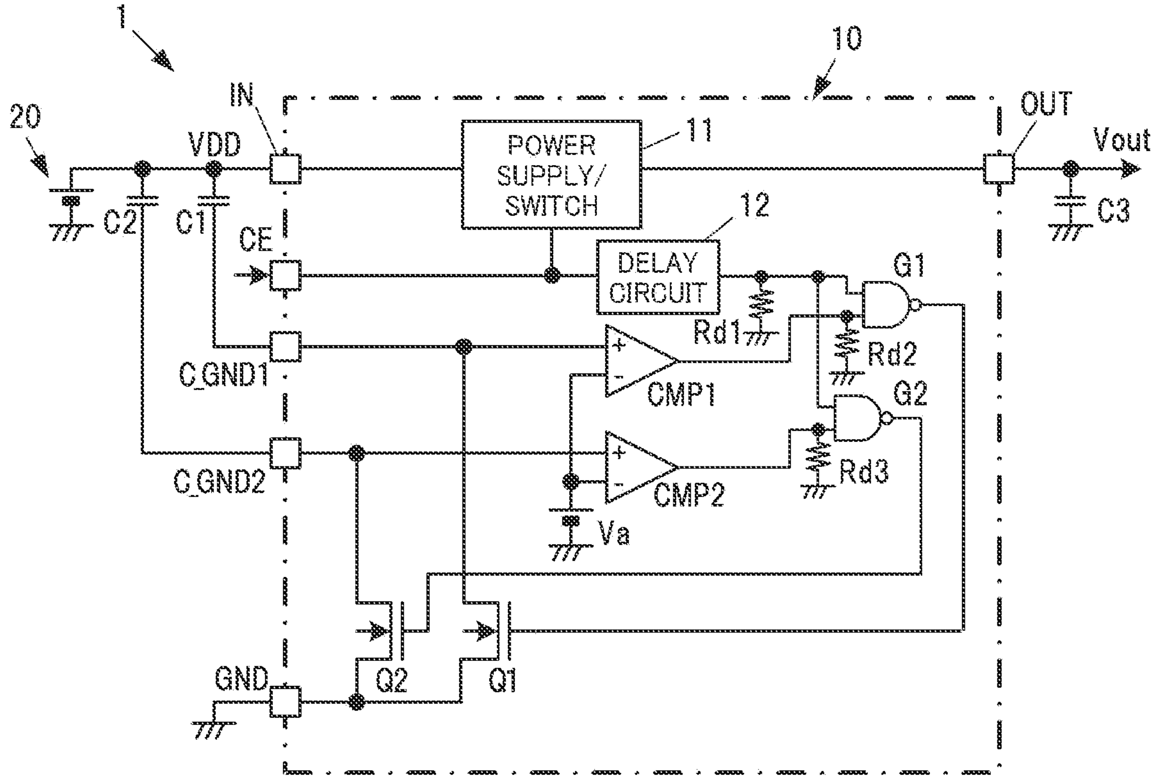
FIG. 1 is a circuit diagram showing an example of a power supply device with an embodiment of a power supply IC applying the present disclosure.

FIG. 1 shows an embodiment of a power supply device 1 having a power supply IC to which the present disclosure is applied. In FIG. 1, the portion surrounded by a single dotted line is formed as a semiconductor integrated circuit (IC) 10 on a semiconductor chip such as single crystal silicon, and a capacitor C3 is connected to the power supply output terminal OUT of the IC 10. In addition, two ceramic capacitors C1 and C2 are connected in parallel as bypass capacitors, each having one terminal connected to the input terminal IN. The capacitors C1 and C2 each have the capacitance value required to function as bypass capacitors by themselves. Specific examples of power supply ICs are regulator ICs and high-side switch ICs.

In the power supply IC 10 of the present embodiment, as shown in FIG. 1, between the power supply input terminal IN to which the DC voltage VDD is applied and the power supply output terminal OUT to which various devices that serve as loads are connected, there is a main functional circuit 11 such as a power supply circuit that converts and outputs the DC voltage VDD supplied from a battery 20 or a switch circuit that supplies and shuts off the power supply voltage of the battery 20 to the load. In either case of the power supply circuit or the switch circuit, the main functional circuit 11 includes a transistor element for output such as a P-channel MOS transistor or an N-channel MOS transistor connected between the power supply input terminal IN and the power supply output terminal OUT.

When the main functional circuit 11 is a power supply circuit, the main functional circuit 11 includes, for example, the above transistor element and an error amplifier that controls the above transistor element so that the output voltage Vout becomes a predetermined voltage according to the potential difference between a feedback voltage obtained by dividing the output voltage and a predetermined reference voltage. When the main functional circuit 11 is a switch circuit, the main functional circuit 11 consists of the above transistor element (switch) and a logic circuit or amplifier circuit that takes an external on/off control signal (CE) as input and generates a signal to control the supply/shutdown of the power supply by the above transistor element.

The power supply IC 10 of the present embodiment has a chip control terminal CE to be input signals from an external microcontroller (CPU) or the like are input. In the case in which the main functional circuit 11 is either a power supply circuit or a switch circuit, when the terminal CE is set to a low level, the IC 10 stops working.

In the power supply IC 10 of the present embodiment, two external terminals C_GND1 and C_GND2 are provided. The other terminals of the ceramic capacitors C1 and C2, one terminals of which are connected to the power supply input terminal IN, are respectively connected to the external terminals C_GND1 and C_GND2. In addition, N-channel MOS transistors Q1 and Q2 for switching (with on-resistance ranging from several mΩ to several 100 mΩ) are provided between the terminals C_GND1 and C_GND2 and the ground terminal GND of the IC, respectively.

In addition, the power supply IC 10 is provided with comparators CMP1 and CMP2 that compare the voltages of the above external terminals C_GND1 and C_GND2 with a predetermined comparison voltage Va, a delay circuit 12 that delays the signal of the above chip control terminal CE, and NAND gates G1 and G2 input the output signal of the delay circuit 12 and the output signals of the above comparators CMP1 and CMP2. The output signals of the NAND gates G1 and G2 are configured to be input to the gate terminals of the above switching MOS transistors Q1 and Q2, respectively. One input terminal of the comparator CMP1 is connected to the external terminal C_GND1, and the comparison voltage Va is applied to the other input terminal. One input terminal of the comparator CMP2 is connected to the external terminal C_GND2, and the comparative voltage Va is applied to the other input terminal.

In addition, pull-down resistors Rd1 to Rd3 are connected to each input terminal of the NAND gates G1 and G2. The delay circuit 12 is provided to keep the transistors Q1 and Q2 on immediately after the power supply is turned on, even if there is an abnormality such as an open or short in the capacitors C1 and C2. Immediately after the power supply is turned on, at least one of the input signals of the NAND gates G1 and G2 is made low by the pull-down resistors Rd1 to Rd3, which makes the outputs of the NAND gates G1 and G2 go high, and the transistors Q1 and Q2 are turned on.

Furthermore, in the power supply IC 10, the outputs of the comparators CMP1 and CMP2 are low level in the normal operating state when the DC voltage VDD from the battery 20 is applied to the input terminal IN and a high level signal is input to the chip control terminal CE. Therefore, the outputs of the NAND gates G1 and G2 are high level and the transistors Q1 and Q2 are turned on. If the capacitors C1 and C2 are normally, the external terminals C_GND1 and C_GND2 are at ground potential and the transistors Q1 and Q2 keep turn on.

When either one of the above capacitors C1 or C2 is shorted, the potential of the external terminal C_GND1 or C_GND2 of the shorted one rises. When the potential of C_GND1 or C_GND2 exceeds the threshold (comparison voltage Va) of the comparator CMP1 or CMP2, the output of CMP1 or CMP2 becomes high.

As a result, the output of NAND gate G1 or G2 becomes a low level, the transistor Q1 or transistor Q2 connected to the shorted capacitor is turned off, and the shorted capacitor is disconnected from the ground potential. However, since capacitors C1 and C2 each have the capacitance value required to function as a bypass capacitor by itself, the power supply device can still operate normally even if one of the capacitors is disconnected. If either one of the capacitors C1, C2 becomes open, the power supply device can work normally since the other capacitor is functioning properly.

Figure 2:
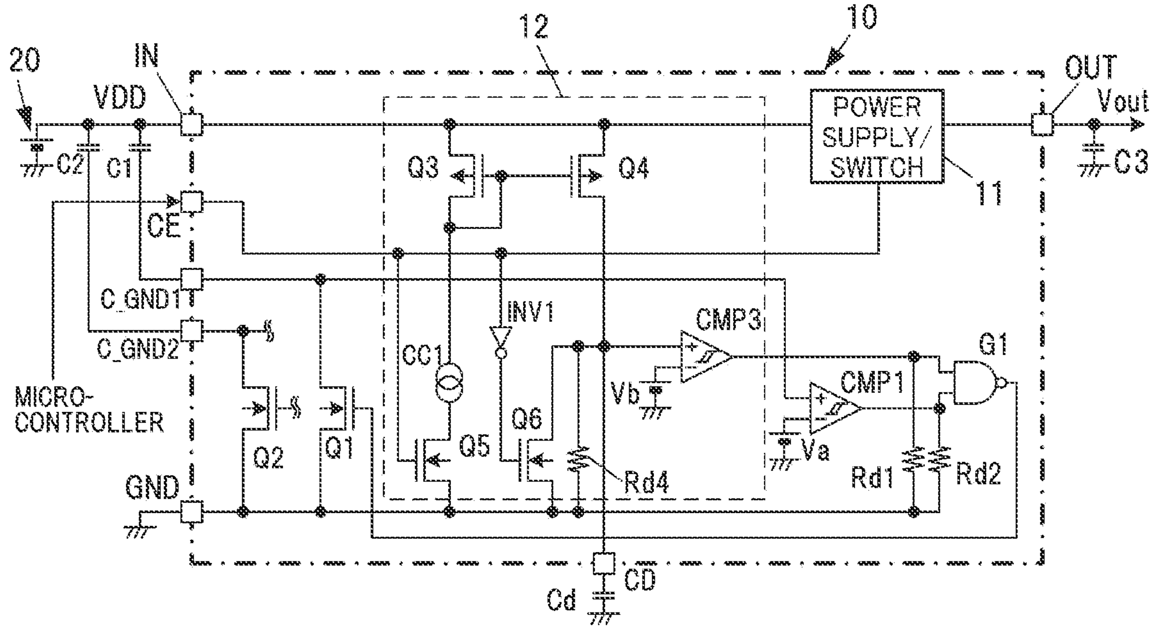
FIG. 2 is a circuit diagram showing an example of a more specific circuit configuration of the power supply IC of the embodiment.

Next, a specific circuit example of the delay circuit 12 is described using FIG. 2. In FIG. 2, the comparator CMP2 and NAND gate G2 in FIG. 1 are omitted from the figure. In FIG. 2, the output signal of the NAND gate G2, which is omitted, is input to the gate terminal of the MOS transistor Q2.

As shown in FIG. 2, the delay circuit 12 has a pair of P-channel MOS transistors Q3 and Q4, which constitute a current mirror circuit with the source terminal connected to the input terminal IN and the gate terminal connected in common, a constant current source CC1 and an N-channel MOS transistor Q5 are connected in series with the above transistor Q3 between the input terminal IN and the ground terminal GND. The input signal of the control terminal CE is applied to the gate terminal of the transistor Q5.

The above delay circuit 12 has an N-channel MOS transistor Q6 connected between the drain terminal of the above transistor Q4 and the ground point, and the gate terminal of the transistor Q6 is applied an inverted signal of the input signal of the control terminal CE by inverter INV1. Furthermore, the drain terminal of the above transistor Q4 is connected to the external terminal CD provided in the power supply IC 10, and an external capacitor Cd is connected between the external terminal CD and the ground point. The delay circuit 12 also has a comparator CMP3 with the drain voltage of the above transistor Q4 input to the non-inverting input terminal and the comparison voltage Vb input to the inverting input terminal, and the capacitor Cd and the comparator CMP3 constitute an analog timer circuit. A pull-down resistor Rd4 is connected between the non-inverting input terminal of the comparator CMP3 and the ground point.

The circuit example of the comparator CMP2 and the NAND gate G2, omitted from the figure, is the same circuit diagram as the comparator CMP1 and the NAND gate G1.

Figure 3:
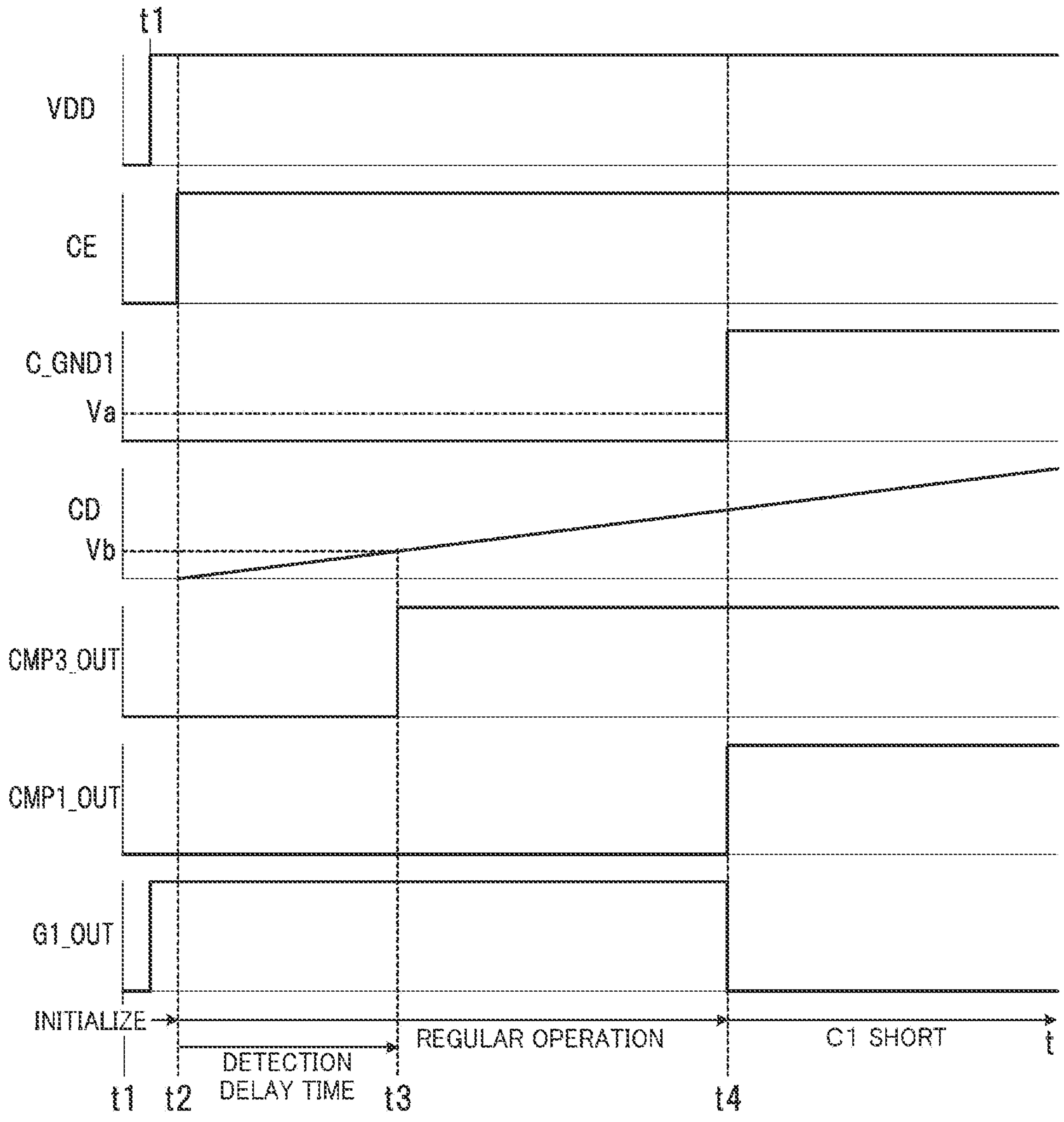
FIG. 3 is a timing chart showing an example of the operation timing of the power supply IC of the embodiment.

The function and operation of the delay circuit 12 are explained next using the operational timing chart in FIG. 3.

When the DC voltage VDD from the battery 20 is input to the input terminal IN of the power supply IC 10 at timing t1, the circuits included power supply IC 10 is initialized. Then, when a high level signal is input to the chip control terminal CE at timing t2, the transistor Q5 is turned on to activate the current mirror circuit (Q3, Q4) and the transistor Q6 is turned off.

Then, the capacitor Cd connected to the external terminal CD is charged by the current flowing in the transistor Q4 that constitutes the current mirror circuit, and the voltage of the external terminal CD, or the drain terminal of the transistor Q4, gradually increases. When the voltage of the external terminal CD reaches the threshold of the comparator CMP3 (comparison voltage Vb), the output of the comparator CMP3 changes to a high level (timing t3), and the power supply IC 10 starts normally operation.

Then, at timing t4, if the capacitor C1 is shorted, the potential of the external terminal C_GND1 suddenly rises. Then, the output of the comparator CMP1 changes to a high level and the output of the NAND gate G1 changes from a high level to a low level. This turns off the transistor Q1 for switch and disconnects the shorted capacitor C1 from the ground potential. Therefore, from then on, the capacitor C1 no longer functions as a bypass capacitor on the input terminal IN. On the other hand, since the capacitor C2 is functioning normally, it is possible to keep working the power supply device 1 normally.

The case in which the other capacitor C2 is shorted is the same as the case in which the capacitor C1 is shorted. If the capacitor C2 is shorted, the output of the NAND gate G1 changes to a low level, the transistor Q2 for switching is turned off, and the capacitor C2 is disconnected from the ground potential.

As mentioned above, in the power supply IC 10 of the present embodiment, two ceramic capacitors C1 and C2, each having the capacitance value required to function as a bypass capacitor on its own, are provided as bypass capacitors. Therefore, if either capacitor C1 or capacitor C2 is shorted, even if the shorted capacitor is disconnected, the other capacitor can still operate normally as a bypass capacitor.

In addition, switches (Q1, Q2) connected in series with the capacitors C1, C2 are provided, and each of the switches is configured to turn off to disconnect the shorted capacitor. Therefore, as shown by A in FIG. 7, it is no longer necessary to connect four capacitors as countermeasure for compensation of voltage resistance, shorts, and opens in the bypass capacitor, thus avoiding increases in cost, number of components, and mounting area.

Figure 7:
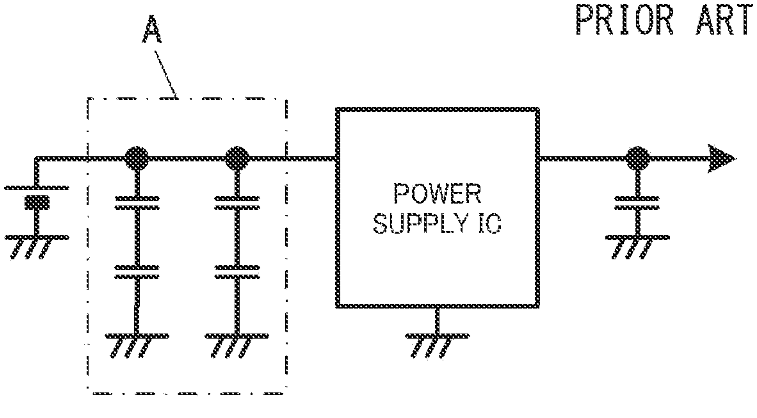
FIG.7 PRIOR ART
FIG. 7 is a circuit diagram showing an example configuration of a power supply device using a conventional power supply IC.

As an example, the number of bypass capacitors connected in series in the conventional example in FIG. 7 is two, but there may be three or more. In other words, the number of bypass capacitors connected in series in the present disclosure is not limited to one, but also includes two or more bypass capacitors connected in series.

Application Example

Next, the application example of the power supply IC 10 of the above embodiment will be described.

Figure 4:
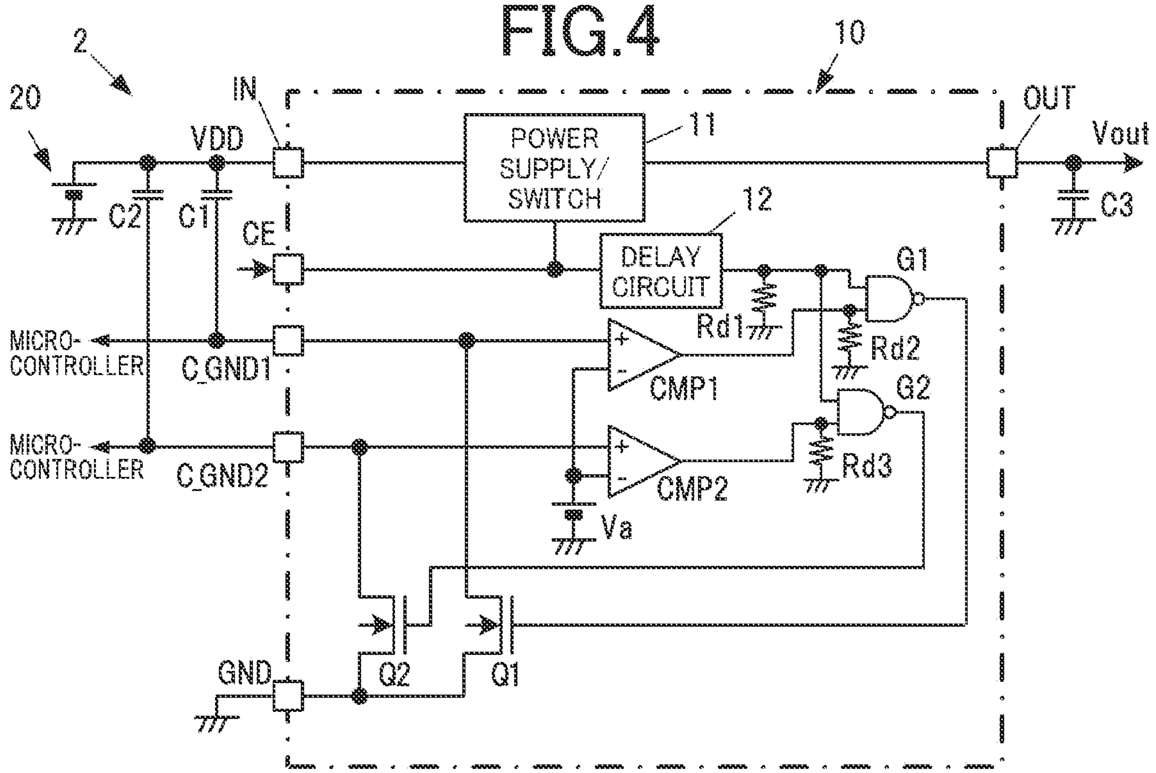
FIG. 4 is a system configuration diagram showing an example of an application (usage form) of the power supply IC of the embodiment.

FIG. 4 shows a first application example (first use form) of a power supply device 2 with the power supply IC 10 of the above embodiment.

As shown in FIG. 4, this application example monitors whether the capacitor C1 or C2 is shorted by inputting the voltage of the external terminals C_GND1 and C_GND2, to which the ground-side terminals of the capacitors C1 and C2 are connected, to microcontrollers. By configuring the system in this way, it is possible to detect the occurrence of an abnormality such as a short in the capacitors C1 and C2, and also to detect whether the abnormality occurred in the capacitor C1 or C2 when the abnormality does occur.

It is very unlikely that the capacitors C1 and C2 will fail simultaneously. Therefore, the failed capacitor can be replaced after the microcontroller detects the abnormality. As a result, the possibility of power supply device failure can be minimized.

Figure 5:
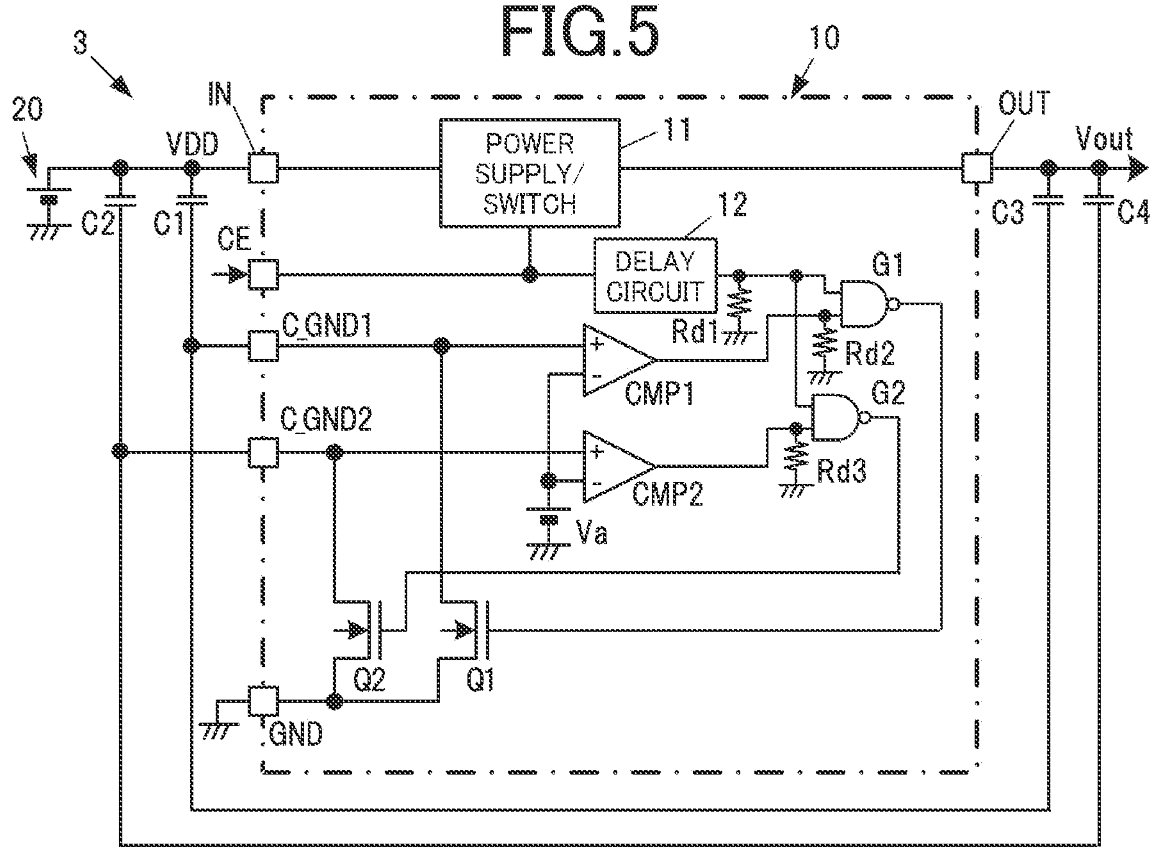
FIG. 5 is a system configuration diagram showing another example of an application (use form) of the power supply IC of the embodiment.

FIG. 5 shows a second application example (second use form) of a power supply device 3 with the power supply IC 10 of the above embodiment.

In the application example shown in FIG. 5, there are provided parallel-connected capacitors C3 and C4, one terminals of which are connected to the output side of the power supply IC 10 and the other terminals are connected to the power supply output terminal OUT, respectively, as bypass capacitors on the output side of the power supply IC 10 of the above embodiment. The other terminals of the capacitors C3 and C4 are connected to the external terminals C_GND1 and C_GND2 common to the input side capacitors C1 and C2, respectively. Such embodiment is particularly effective when the power supply IC 10 is a high-side switch IC.

According to the above configuration, when either of the capacitors C3 or C4, which constitute the bypass capacitor on the output side, is shorted, the transistor Q1 or Q2 for switching connected to the external terminal (C_GND1 or C_GND2) on the shorted side is turned off. As a result, the capacitor where the short occurred can be disconnected from the ground potential, and the short circuit current can be prevented from flowing from the DC power supply 20 to the ground potential through the main functional circuit (power supply/switch) 11 or from the DC power supply 20 to the ground potential.

Therefore, as with the bypass capacitor on the input/output side indicated by A in FIG. 7, the number of elements used can be reduced compared to installing two rows of two capacitors in series as counter measure for compensation of voltage resistance and short circuits.

By using, as the capacitors C3 and C4, capacitors each of which has a capacitance value required to function as a bypass capacitor on its own, the capacitors can effectively function as a bypass capacitor even if either one of the capacitors C3 or C4 is open or shorted.

Modification

Next, a modification of the power supply IC 10 of the above embodiment is described.

Figure 6:
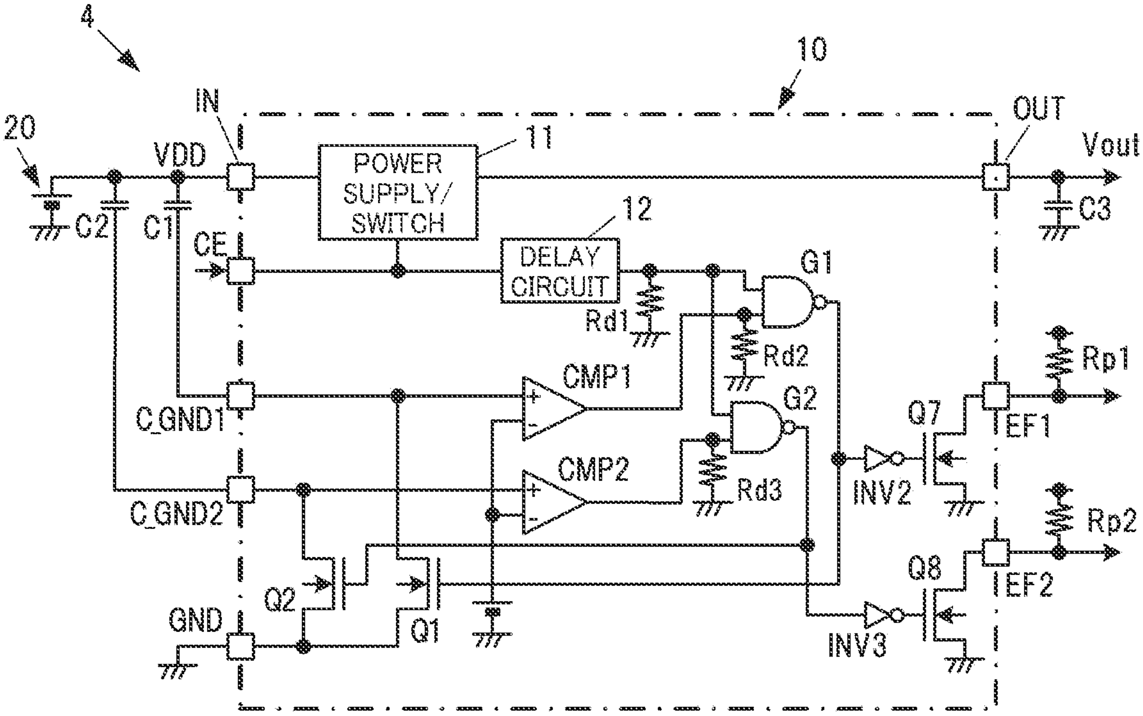
FIG. 6 is a circuit diagram showing an example of a power supply device with a modification of the power supply IC of the embodiment.

FIG. 6 shows the circuit configuration in a power supply device 4 with a modification of the power supply IC 10 of the above embodiment.

The modification of the power supply IC 10 shown in FIG. 6 is configured with error flag terminals EF1 and EF2 to output an error detection signal to an external device such as a microcontroller when an abnormality such as a short occurs in either the capacitor C1 or C2.

Specifically, as shown in FIG. 6, N-channel MOS transistors Q7 and Q8 are provided with their drain terminals connected to the error flag terminals EF1 and EF2. Furthermore, the output signals of the NAND gates G1 and G2, which generate ON and OFF control signals for the transistors Q1 and Q2 for switching, are inverted by inverters INV2 and INV3, and are input to the gate terminals of these transistors Q7 and Q8.

Pull-up resistors Rp1 and Rp2 are connected to the external signal lines connected to the error flag terminals EF1 and EF2, respectively. When the transistors Q7 and Q8 are turned on, current flows through the pull-up resistors Rp1 and Rp2 to transmit a low level signal to the external device. When the transistors Q7 and Q8 are turned off, a high level signal is transmitted to the external device. The error output signal of the capacitor C1 is the error flag terminal EF1, and the error output signal of the capacitor C2 is the error flag terminal EF2.

If the capacitor C1 is shorted, the voltage of the external terminal C_GND1 becomes higher than Va, and the comparator CMP1 outputs a high level signal. Waiting for a high level signal from the delay circuit, the NAND gate G1 outputs a low level. This turns on the transistor Q7, and the power supply IC 10 outputs a low level signal from the error flag terminal EF1 to the outside.

If the capacitor C2 is shorted, the voltage of the external terminal C_GND2 becomes higher than Va, and the comparator CMP2 outputs a high level signal. Waiting for a high level signal from the delay circuit, the NAND gate G2 outputs a low level. This turns on the transistor Q8, and the power supply IC 10 outputs a low level signal from the error flag terminal EF2 to the outside.

Instead of providing the two error flag terminals EF1 and EF2 as shown in FIG. 6, for example, one error flag terminal and one MOS transistor whose drain terminal is connected to the terminal may be provided, and furthermore, an OR gate may be provided with the output signals of inverters INV2 and INV3 as inputs, and the output signal may be input to the gate terminal of the above MOS transistor whose drain terminal is connected to the error flag terminal.

The power supply IC 10 in this modification can also be used in the same manner as the application example shown in FIG. 5, where the capacitors C3 and C4, which are bypass capacitors on the output side, are also connected to the external terminals C_GND1 and C_GND2, respectively.

The contents of the present disclosure have been specifically explained based on the embodiments above, but the present disclosure is not limited to the above embodiments. For example, the above embodiment describes a case in which the present disclosure is applied to a power supply IC that includes a power supply circuit such as a series regulator or a power supply IC that functions as a high-side switch, but the power supply circuit is not limited to a series regulator. The power supply circuit may also be switching type DC-DC converters or linear regulators such as LDOs (Low Drop Out).

The transistor between the input and output terminals in the main functional circuit 11 may be a discrete transistor instead of an on-silicon element to reduce on-resistance.

Figure 8:
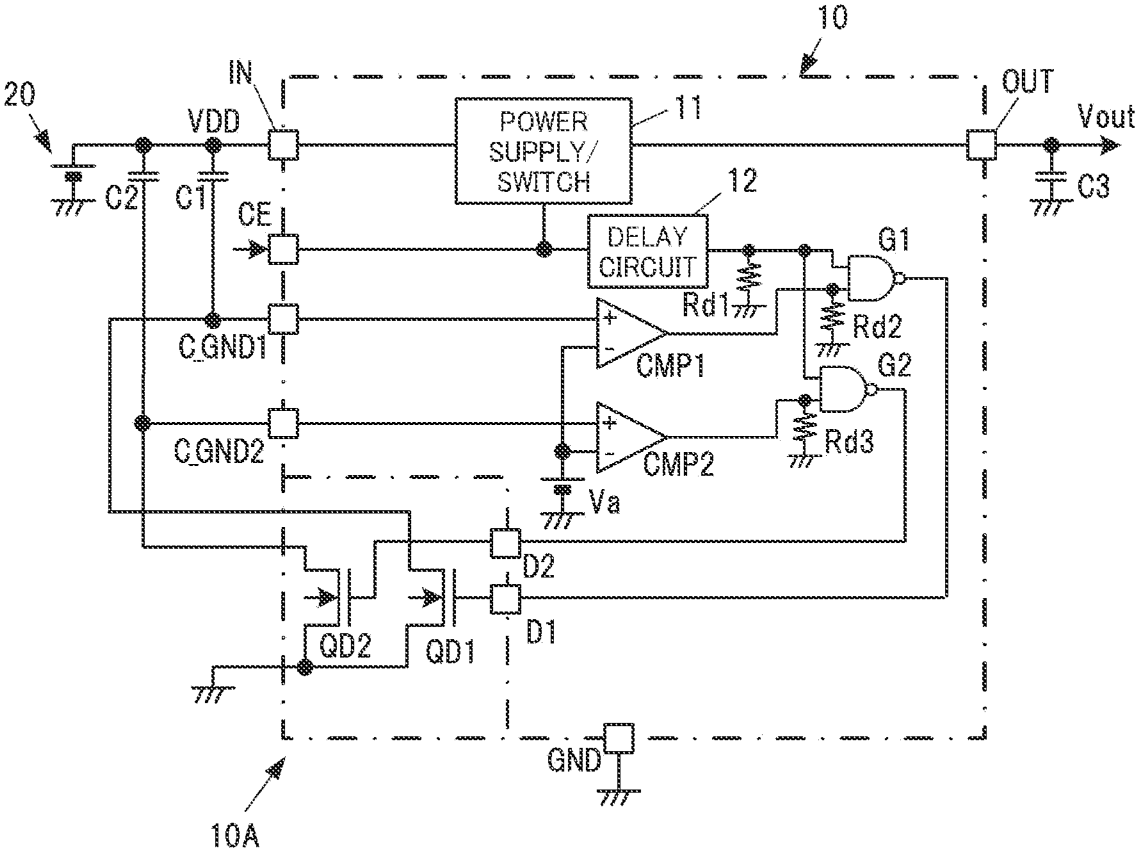
FIG. 8 is a circuit diagram showing an example of a power supply device with a further modification of the power supply IC of the embodiment.

Furthermore, transistors Q1 and Q2 for switching may also be discrete transistors QD1 and QD2 instead of on-silicon elements to reduce on-resistance. As shown in FIG. 8, the power supply IC 10 may be provided with terminals D1 and D2 to output the output signals of the NAND gates G1 and G2.

Here, the transistor QD1 is provided between the external terminal C_GND1 and the ground point, and the output terminal D1 is connected to the gate electrode of the transistor QD1. Also, the transistor QD2 is provided between the external terminal C_GND2 and the ground point, and the output terminal D2 is connected to the gate electrode of the transistor QD2. The power supply IC 10 and the discrete transistors QD1 and QD2 may then be configured as a power supply IC 10A enclosed in a single package. As a result, mounting of the transistors at the customer's side who purchased the power supply IC in this example can be made unnecessary.

The power supply IC 10 of the above-mentioned embodiment (FIG. 1) or modification (FIG. 6) may be provided with circuits that have function of detecting abnormalities, such as an overcurrent detection circuit, a current limit circuit, and a thermal shutdown circuit. In that case, a terminal may be provided to output those error detection signals. The logical OR of those error detection signals and the output signals of the NAND gates G1 and G2 may be provided to be output from the external terminals EF1 and EF2 shown in FIG. 6.

According to the power supply semiconductor integrated circuit of an aspect of the present disclosure, when there is an abnormality, such as a short circuit, in one of the two capacitors connected to the first external terminal and the second external terminal, the first or second switch operates to disconnect the capacitor having the abnormality from the ground potential. Therefore, the number of ceramic capacitors constituting the bypass capacitor can be reduced since two rows of two capacitors in series are not required.

In addition, by using two capacitors in parallel, each of which meets the specified capacitance value required by the system, the capacitor can function normally as a bypass capacitor even if one of the two capacitors has a short, open or other abnormality.

Furthermore, by monitoring the voltages of the external terminals to which the first and second capacitors are connected respectively with an external device such as a microcontroller, it is possible to detect the abnormality when the abnormality occurs in the capacitors.

According to the power supply semiconductor integrated circuit of an aspect of the present disclosure, it is possible to electrically disconnect the bypass capacitor that has an abnormality among the bypass capacitors connected in parallel. As a result, the number of series-connected capacitors that the parallel-connected bypass capacitors have can be reduced. In addition, even if one of the parallel ceramic capacitors that make up the bypass capacitor becomes disconnected and open, the function of the bypass capacitor will not be impaired. Furthermore, if an abnormality occurs in the bypass capacitor, the abnormality can be detected.

Although some embodiments of the present invention have been described and illustrated in detail, the disclosed embodiments are made for purposes of not limitation but illustration and example only. The scope of the present invention should be interpreted by terms of the appended claims.

The invention claimed is:

1. A power supply semiconductor integrated circuit, comprising:
- a power supply input terminal to which a power supply voltage from a DC power supply is input;
- a power supply output terminal for outputting an output voltage;
- a ground terminal to which a ground potential is applied;
- a first external terminal to which a second terminal of a first capacitor is connected, wherein the first capacitor is located externally and comprises a first terminal connected to the power supply input terminal;
- a second external terminal to which a second terminal of a second capacitor is connected, wherein the second capacitor is located externally and comprises a first terminal connected to the power supply input terminal;
- a first detector which detects a voltage of the first external terminal;
- a second detector which detects a voltage of the second external terminal;
- a first switch which is provided between the first external terminal and the ground terminal; and
- a second switch which is provided between the second external terminal and the ground terminal, wherein:
- the first switch disconnects the second terminal of the first capacitor from a ground potential upon receiving a signal from the first detector, and
- the second switch disconnects the second terminal of the second capacitor from a ground potential upon receiving a signal from the second detector.

2. The power supply semiconductor integrated circuit according to claim 1, further comprising:
- a third external terminal; and
- a fourth external terminal,
- wherein the first detector outputs an error signal to the third external terminal in response to detection that an abnormality has occurred in the first capacitor, and
- wherein the second detector outputs an error signal to the fourth external terminal in response to detection that an abnormality has occurred in the second capacitor.

3. The power supply semiconductor integrated circuit according to claim 1, further comprising:
- a transistor which is connected between the power supply input terminal and the power supply output terminal; and
- a control circuit which controls the transistor.

4. A power supply semiconductor integrated circuit, comprising:
- a first power supply semiconductor integrated circuit that comprises:
  - a power supply input terminal to which a power supply voltage from a DC power supply is input;
  - a power supply output terminal for outputting power an output voltage;
  - a ground terminal to which a ground potential is applied;
  - a first external terminal to which a second terminal of a first capacitor is connected, wherein the first capacitor is located externally and comprises a first terminal connected to the power supply input terminal;
  - a second external terminal to which a second terminal of a second capacitor is connected, wherein the second capacitor is located externally and comprises a first terminal connected to the power supply input terminal;
  - a first detector which detects a voltage of the first external terminal;
  - a second detector which detects a voltage of the second external terminal;
  - a fifth external terminal which outputs a signal from the first detector; and
  - a sixth external terminal which outputs a signal from the second detector;
- a first switch which is located externally and provided between the first external terminal and a ground point; and
- a second switch which is located externally and provided between the second external terminal and a ground point, wherein;
- the first switch disconnects the second terminal of the first capacitor from a ground point upon receiving the signal of the first detector output from the fifth external terminal, and
- the second switch disconnects the second terminal of the second capacitor from a ground point upon receiving the signal of the second detector output from the sixth external terminal.

5. A power supply device, comprising:
- a power supply input terminal to which a power supply voltage from a DC power supply is input;
- a power supply output terminal for outputting an output voltage;
- a ground terminal to which a ground potential is applied;
- a first external terminal to which a second terminal of a first capacitor is connected, wherein the first capacitor is located externally and comprises a first terminal connected to the power supply input terminal;
- a second external terminal to which a second terminal of a second capacitor is connected, wherein the second capacitor is located externally and comprises a first terminal connected to the power supply input terminal;
- a first detector which detects a voltage of the first external terminal;
- a second detector which detects a voltage of the second external terminal;
- a first switch which is provided between the first external terminal and the ground terminal;
- a second switch which is provided between the second external terminal and the ground terminal, wherein;
- the first switch disconnects the second terminal of the first capacitor from a ground potential upon receiving a signal from the first detector, and
- the second switch disconnects the second terminal of the second capacitor from a ground potential upon receiving a signal from the second detector; and
- a voltage monitoring circuit which is located externally and monitors the voltage of the first external terminal and the voltage of the second external terminal.

6. A power supply device according to claim 5, further comprising:
- a battery which is connected to the power supply input terminal.

7. The power supply device according to claim 6, further comprising:

a third capacitor which is connected between the power supply output terminal and the first external terminal; and a fourth capacitor which is connected between the power supply output terminal and the second external terminal.

* * * * *